STEREOPHONIC SIGNAL TRANSMISSION SYSTEM LEVEL CONTROL

Filed Aug. 11, 1961

United States Patent Office 3,197,561
Patented July 27, 1965

3,197,561
STEREOPHONIC SIGNAL TRANSMISSION SYSTEM LEVEL CONTROL

Eric Wollaston Berth-Jones, West Ealing, London, England, assignor to Electric & Musical Industries Limited, Hayes, Middlesex, England, a company of Great Britain Filed Aug. 11, 1961, Ser. No. 130,918
Claims priority, application Great Britain, Aug. 16, 1960, 28,265/60
6 Claims. (Cl. 179—1)

This invention relates to stereophonic signal transmission systems, such as stereophonic recording, reproducing or broadcasting systems in which two channels are employed, one for transmitting so-called left-hand signals and the other for transmitting so-called right-hand signals.

In such systems it is desirable to be able to control the level of the signals during transmission through the channels and heretofore this has necessitated the use of an attenuator in each channel. These attenuators are required to be accurately matched and ganged together for simultaneous operation since if differential attenuation be introduced then such might, in a stereophonic system, cause a change in position of the apparent sound source during reproduction. It is therefore desirable to provide a signal transmission system with a view to avoiding the necessity of accurately matched and ganged attenuators and according to the invention there is provided a stereophonic signal transmission system comprising a left-hand and a right-hand signal source, a left-hand and a right-hand signal utilisation means, a left-hand and a right-hand channel along which sets of signals from said left-hand and said right-hand signal source are respectively transmitted to said left-hand and said right-hand signal utilisation means, an attenuator for controlling the signal transfer in both channels simultaneously and means for feeding the left-hand set of signals through said attenuator in one direction, and means for feeding the right-hand set of signals through the attenuator in an opposite direction, wherein each said feeding means substantially prevents either set of signals from passing to the inappropriate output utilisation means. Thus in the case where the invention is applied to a stereophonic system one channel may be a channel for transmitting left-hand signals and the other channel a channel for transmitting right-hand signals and said means is so arranged as to reduce any tendency for the right-hand signals to be fed to the left-hand channel which is inappropriate for the right-hand signals and also to reduce any tendency for the left-hand signals to be fed to the right-hand channel which is inappropriate for the left-hand signals. It will be appreciated that the use of a common attenuator or other device serves to prevent any differential attenuation from being introduced into the signals.

In order that the said invention may be clearly understood and readily carried into effect, it will now be more fully described with reference to the accompanying drawings.

Figure 1:
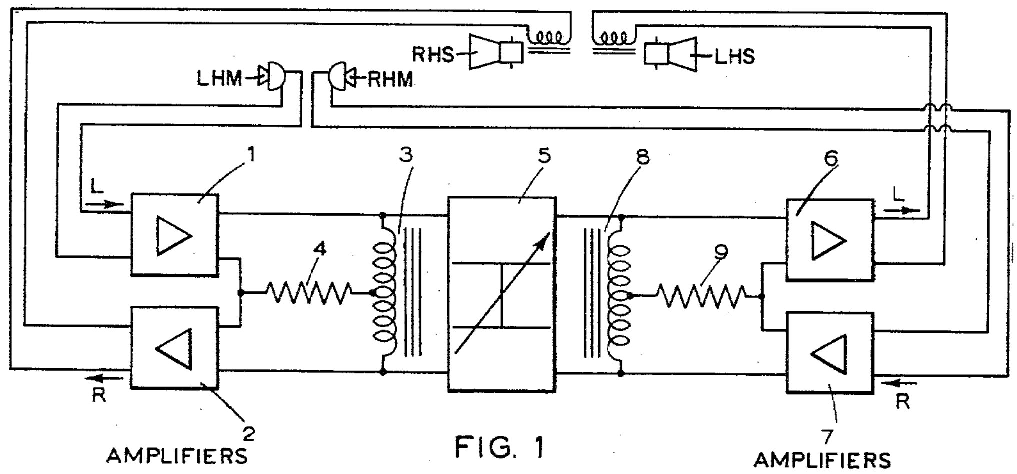
Figure 2:
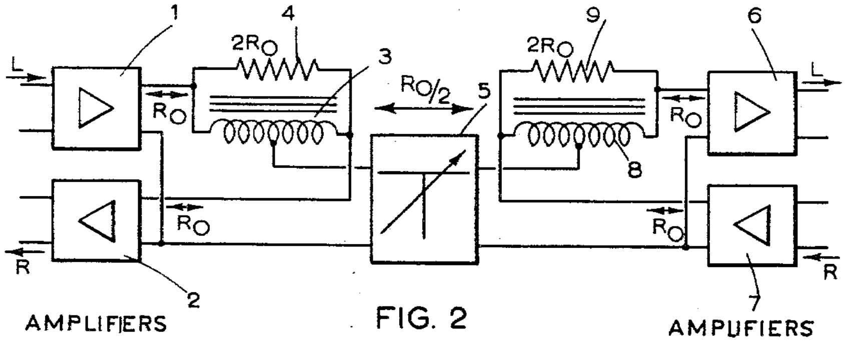
Figure 3:
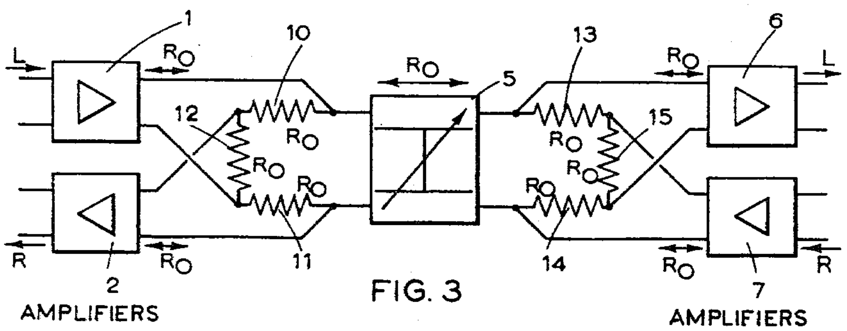

FIGURE 1 illustrates diagrammatically a stereophonic signal transmission system in accordance with one embodiment of the invention, and FIGURES 2 and 3 are similar diagrams illustrating further embodiments of the invention.

The invention is particularly applicable to a two-channel stereophonic recording, reproducing or broadcasting system, the two channels being indicated at L and R, the channel L serving to transmit the left-hand signals derived from the microphone LHM and the channel R serving to transmit the right-hand signals to a loudspeaker RHS. The left-hand signals are fed into the input of an amplifier 1 and the right-hand signals are fed out of the system shown in FIGURE 1 from a further amplifier indicated at 2. These two amplifiers are coupled to a hybrid type network comprising a tightly coupled centre tapped autotransformer 3 and a balancing resistor 4, the network being connected to the output terminals of the amplifier 1 and to the input terminals of the amplifier 2 in the manner shown, the network being in turn connected to a balanced constant impedance attenuator 5. It is known, with a network of the kind shown in FIGURE 1, that if the two halves of the transformer 3 are tightly coupled and if the resistor 4 has a value equal to ¼ of the terminating resistance of the network which as shown in FIGURE 1 is provided by the impedance of the attenuator 5, then there will be substantially no transmission of signals between the pairs of terminals of the network which are connected to the amplifiers 1 and 2. Thus there will be substantially no leakage of signals between the amplifiers 1 and 2 but left-hand signals passing through the amplifier 1 will pass through the attenuator 5 from left to right. Subsequent to the attenuator 5 there is provided a further amplifier 6 the output of which feeds the left-hand signals to the left-hand channel L and the loudspeaker LHS and a further amplifier 7 to the input of which right-hand signals from the microphone RHM are fed from the channel R. These two amplifiers 6 and 7 are coupled to the attenuator 5 through a hybrid network similar to that described above and comprising a tightly coupled centre tapped autotransformer 8 and a balancing resistor 9 and connected in the manner shown. Thus right-hand signals entering the amplifier 7 are substantially prevented from reaching the amplifier 6 and thence passing to the left-hand channel but the right-hand signals will pass through the attenuator 5 from right to left. Left-hand signals passing from left to right through the attenuator 5 are unaffected by the transformer 8 and do not appear across the resistor 9 but are shared equally between the equal input and output impedances of the amplifiers 6 and 7 respectively. Left-hand signals thus pass to the amplifier 6 and hence to the left-hand channel L connected to the output of the amplifier 6 but the left-hand signals cannot pass in the reverse direction through the amplifier 7 and therefore do not appear in the right-hand channel. In a similar manner right-hand signals entering the input of the amplifier 7 pass to the output of the amplifier 2 but are prevented by amplifier 1 from appearing in the left-hand channel L. Thus the right-hand signals and the left-hand signals are passed in opposite directions through the common attenuator 5 and are substantially prevented from becoming fed to inappropriate channels. Adjustment of the common attenuator 5 serves to impart an equal degree of attenuation to the signals passing in both directions therethrough and thus the possibility of imparting differential attenuation to the signals is substantially avoided.

It it not necessary for the output impedance of the amplifier 1 to be equal to the input impedance of the amplifier 2, nor for the input impedance of the amplifier 6 to be equal to the output impedance of the amplifier 7 providing that suitable tappings are selected on the transformers 3 and 8 respectively proportional to these associated impedances so that the bridge-balance of the network is maintained. The resistor 4 should be substantially equal to the input and output impedances of the amplifiers 2 and 1 respectively in parallel and similarly the resistor 9 must be substantially equal to the input and output impedances of the amplifiers 6 and 7 respectively in parallel. The impedance of the attenuator 5 should remain constant at each end when the ends are terminated respectively by the sum of the input and output impedances, of the associated amplifiers (2, 1 and 6, 7 respectively) and at a value equal to this sum. It therefore follows that each amplifier input impedance must be equal to its source impedance and each amplifier output impedance must be equal to its load impedance within fairly close limits over the whole of the significant frequency spectrum of the signals transmitted through the channels. Thus the amplifiers must be matched at their terminations. The arrangement shown in FIGURE 1 is a balanced type of circuit and thus the attenuator 5 must also be a balanced attenuator such as a "balanced T" type. The earthing point may be the centre of the attenuator or the tapping point on one of the auto-transformers 3 or 8. However if the input and output impedances of the amplifiers 2 and 1 in the one case, or the amplifiers 6 and 7 in the other case are not equal the attenuator will operate in an unbalanced condition about earth, and break-through of high frequency signals may become apparent due to stray capacities to earth of the components employed in the attenuator. The microphones LHM and RHM and the loudspeakers LHS and RHS are mounted in geometric relationship to respectively accept and reproduce stereophonic signals in a manner well known in the art. The actual positions shown in the figure are diagrammatic only and do not illustrate the relationship.

In the embodiment of the invention shown in FIGURE 2 the circuit is inverted, in such a way that one terminal of each of the pairs of amplifiers 1, 2 and 6, 7 respectively, and one terminal of the attenuator 5, which in this embodiment is of the unbalanced "bridged T" type, are connected together, and may be earthed to produce a true unbalanced circuit. In this arrangement, the characteristic impedance of the attenuator 5 in both directions must be equal to the input and output impedances of the amplifiers 2 and 1 respectively in parallel and the input and output impedances of the amplifiers 6 and 7 in parallel, and the balance resistors 4 and 9 must each be equal to the sum of the associated input and output impedances in series. The circuit impedances are indicated by $R_0$. The capacitance between the windings of the transformers 3 and 8 and earth must be kept small compared with the circuit impedances. This arrangement has the further advantage of requiring only an unbalanced attenuator, which is smaller, simpler, and hence less expensive.

FIGURE 3 shows another embodiment of the invention in which the hybrid network has been replaced by a pair of balanced resistive bridges comprising resistors 10, 11, 12 and 13, 14, 15, resulting in a reduction in cost. This advantage is obtained at the expense of 6 db greater loss. Ideally the attenuator should be of the balanced type, with centre earth, and, as in the embodiment described with reference to FIGURE 1, may conveniently comprise a "balanced T" network but provided that the circuit impedance $R_0$ is low compared with the stray capacities to earth, an unbalanced type earthed at the common connection would be satisfactory.

If desired attenuation equalisers and other components requiring duplication in both channels may also be included in the common path provided they are of the constant impedance type.

It will be seen that the microphones and speakers shown in FIGURE 1 are omitted in FIGURES 2 and 3. This is merely in the interest of simplicity, and the components will in fact require to be included in all the embodiments illustrated.

Although left and right hand channels have been described, the invention may readily be used where sum and difference signals are involved.

What I claim is:

1. A stereophonic signal transmission system comprising a left hand and a right hand signal source, a left hand and a right hand signal utilization means, a left hand and a right hand channel along which sets of signals from said left hand and said right hand signal source are respectively transmitted to said left hand and said right hand signal utilization means, an attenuator for controlling the signal transfer in both channels simultaneously and means for feeding the left hand set of signals through said attenuator in one direction, and means for feeding the right hand set of signals through the attenuator in an opposite direction wherein each said feeding means substantially prevents either set of signals from passing to the inappropriate output utilization means.

2. A stereophonic signal transmission system in accordance with claim 1 in which the attenuator is a balanced constant inmpedance attenuator and wherein each said means for feeding a set of signals through said attenuator comprises a hybrid network common to the ingoing and outgoing channels.

3. A stereophonic signal transmission system in accordance with claim 2 in which said hybrid network comprises an auto-transformer and a balance impedance connected from a tapping on the auto-transformer to the common point of the ingoing and outgoing channels.

4. A stereophonic signal transmission system in accordance with claim 1 in which the attenuator is an unbalanced constant impedance attenuator and wherein each said means for feeding a set of signals through said attenuator comprise a hybrid network common to the ingoing and outgoing channels.

5. A stereophonic signal transmission system in accordance with claim 4 in which each of said hybrid networks comprises an auto-transformer and a parallel balancing impedance connected between first corresponding terminals of the ingoing channel and the outgoing channel the attenuator being connected from a tapping on said auto-transformer to a point common to second corresponding terminals of the ingoing and outgoing channels.

6. A sterephonic signal transmission system in accordance with claim 1 in which the attenuator is a balanced constant impedance attenuator and wherein each said means for feeding a set of signals through said attenuator comprises a bridge network common to the ingoing and outgoing channels.

References Cited by the Examiner

UNITED STATES PATENTS 1,592,883 7/26 Barton et al. ______________ 333—8

FOREIGN PATENTS 363,398 10/38 Italy.

OTHER REFERENCES

Campbell and Foster: "Maximum Output Networks for Telephone Substation and Repeater Circuits" AIEE Transactions 1920, pages 231 to 280; pages 288 to 290, FIGURE 7.

ROBERT H. ROSE, *Primary Examiner.*

HERMAN K. SAALBACH, *Examiner.*